United States Patent
Kuo et al.

(10) Patent No.: US 10,838,248 B2
(45) Date of Patent: Nov. 17, 2020

(54) OPTICAL FILM

(71) Applicant: BenQ Materials Corporation, Taoyuan (TW)

(72) Inventors: Chen-Kuan Kuo, Taoyuan (TW);
Cyun-Tai Hong, Taoyuan (TW);
Meng-Chieh Chou, Taoyuan (TW);
Chuen-Nan Shen, Taoyuan (TW);
Meng-Jie Lin, Taoyuan (TW);
Chia-Feng Lin, Taoyuan (TW);
Fung-Hsu Wu, Taoyuan (TW);
Meng-Chia Cheng, Taoyuan (TW)

(73) Assignee: BenQ Materials Corporation, Taoyuan (TW)

(*) Notice: Subject to any disclaimer, the term of this patent is extended or adjusted under 35 U.S.C. 154(b) by 33 days.

(21) Appl. No.: 16/036,704

(22) Filed: Jul. 16, 2018

(65) Prior Publication Data
US 2019/0025632 A1    Jan. 24, 2019

Related U.S. Application Data

(60) Provisional application No. 62/535,154, filed on Jul. 20, 2017, provisional application No. 62/535,145, filed on Jul. 20, 2017.

(30) Foreign Application Priority Data

Dec. 14, 2017 (TW) .............................. 106144024 A

(51) Int. Cl.
*G02F 1/1335* (2006.01)
*G02B 5/18* (2006.01)
(Continued)

(52) U.S. Cl.
CPC ..... *G02F 1/133504* (2013.01); *G02B 5/1842* (2013.01); *G02B 5/1866* (2013.01); *G02B 27/4211* (2013.01); *G02B 27/44* (2013.01)

(58) Field of Classification Search
CPC ............ G02F 1/133504; G02B 5/1866; G02B 27/4211; G02B 27/44; G02B 5/1842; G02B 27/4272; G02B 27/4205; G02B 5/1823
(Continued)

(56) References Cited

U.S. PATENT DOCUMENTS 8,422,841 B1 * 4/2013 Shi .......................... G02B 6/124
385/37
2009/0059376 A1 * 3/2009 Hayakawa ......... B29D 11/0073
359/576
(Continued)

FOREIGN PATENT DOCUMENTS

JP    P2010-39259A A    2/2010
TW    200501135 A    1/2005

OTHER PUBLICATIONS

RefractiveIndex.info (available at https://refractiveindex.info/?shelf=main&book=Ta2O5&page=Bright-amorphous and https://refractiveindex.info/?shelf=main&book=Al2O3&page=Querry-o, accessed Apr. 14, 2020) (Year: 2020).*

*Primary Examiner* — Kimberly N. Kakalec

(57) ABSTRACT

An optical film includes a first diffraction layer, a second diffraction layer, and a cover layer. The first diffraction layer includes a plurality of first diffraction gratings arranged in a direction on a surface thereof. The second diffraction layer is filled in the gap of the first diffraction gratings of the first diffraction layer and forms a plurality of second diffraction gratings arranged in a direction on the first diffraction layer, wherein the directions of the first diffraction gratings and the second diffraction gratings are parallel to each other. The cover layer fills and planarizes the second diffraction gratings of the second diffraction layer. The optical film can reduce the light leakage defect of a conventional liquid crystal display in a wide viewing angle and make the liquid (Continued)

crystal display have a uniform dark-state image and color image quality.

9 Claims, 5 Drawing Sheets

(51) Int. Cl.
*G02B 27/44* (2006.01)
*G02B 27/42* (2006.01)

(58) Field of Classification Search
USPC .......................................... 359/576
See application file for complete search history.

(56) References Cited

U.S. PATENT DOCUMENTS

| | | | | |
|---|---|---|---|---|
| 2012/0206812 | A1* | 8/2012 | Saito | G02B 27/0037 |
| | | | | 359/576 |
| 2012/0262788 | A1* | 10/2012 | Ushigome | G02B 5/1895 |
| | | | | 359/576 |
| 2016/0167422 | A1* | 6/2016 | Brehm | G02B 5/1809 |
| | | | | 359/567 |

* cited by examiner

OPTICAL FILM

This application claims the benefit of Taiwanese application serial No. 106144024, filed on Dec. 14, 2017, U.S. provisional application Ser. No. 62/535,145, filed on Jul. 20, 2017, and U.S. provisional application Ser. No. 62/535,154, filed on Jul. 20, 2017, the subject matters of which are incorporated herein by reference.

BACKGROUND OF THE INVENTION

Field of the Invention

The invention relates in general to an optical film for a liquid crystal display, and more particularly relates to an optical film for reducing color washout and dark-state light leakage defect at wide viewing angles, and increasing the uniformity of the color and dark-state images at wide viewing angle.

Description of the Related Art

The liquid crystal display (LCD) is non-self-luminous display, thus as the backlight passes through the liquid crystal panel, the image quality presents in the side view is lower than that presents in the front view due to the asymmetry of the liquid crystal molecules.

Especially, when presenting black color on the LC display, the LC panel is switched to dark state to shade the light because the backlight cannot be in off-state. Therefore, the contrast and color presented by LC display will vary in different viewing angles and result in the color washout and uneven of the image presented thereon owing to light leakage occurring more or less at different viewing angles. FIG. 1 shows the brightness distribution in a dark state of a common liquid crystal display at horizontal viewing angles. As shown in FIG. 1, the light leakage in dark state reaches to the most at 45° viewing angle and reaches the minimal at 0° viewing angle. The viewers will perceive that the image quality varies at different viewing angles and sense the adversely visual experience.

Therefore, the present invention is to provide an optical film for reducing light leakage at wide viewing angles of the liquid crystal display, increasing uniformity of the dark-state images at different viewing angles and reducing color washout.

SUMMARY OF THE INVENTION

In an aspect of the optical film of present invention, the optical film comprises a first diffraction layer with a upper surface and a lower surface, including a plurality of first diffraction gratings arranged in the same direction on the upper surface thereof; a second diffraction layer with a plurality of second diffraction gratings arranged in the same direction gap-filled in and on the first diffraction gratings of the first diffraction layer, wherein the directions of the first diffraction gratings and the second diffraction gratings are parallel to each other; and a cover layer formed on the second diffraction gratings of the second diffraction layer to fill and planarize the second diffraction gratings of the second diffraction layer.

In an embodiment of the optical film of present invention, the first diffraction layer has a first refraction index of n1, the second diffraction layer has a second refraction index of n2, the cover layer has a third refraction index of n3, and n1, n2 and n3 are all in the range of 1.4 to 1.7.

In another embodiment of the optical film of the present invention, n2 is greater than n1 and n3.

In another embodiment of the optical film of present invention, n1 and n3 can be the same or different.

In another embodiment of the optical film of the present invention, the width w1 of each of the first diffraction gratings and the width w2 of each of the second diffraction gratings are independently in the range of 0.3 μm to 1.5 μm.

In another embodiment of the optical film of the present invention, the depth d1 of each of the first diffraction gratings and the depth d2 of each of the second diffraction gratings are independently in the range of 0.5 μm to 1.5 μm.

In another embodiment of the optical film of the present invention, the grating gap between adjacent two of the first diffraction gratings and the grating gap between adjacent two of the second diffraction ratings are independently in the range of 0.3 μm to 1.5 μm.

In another embodiment of the optical film of present invention, the widths, the depths and the grating gaps of the first diffraction gratings and the widths, the depths and the grating gaps of the second diffraction gratings can be the same or different.

In another aspect of the optical film of the present invention, the optical film further comprises a functional layer on the lower surface of the first diffraction layer, wherein the functional layer is selected from one of a group consisting of a polarizing layer, a hard-coating layer, a low reflective layer, an anti-reflective layer, an anti-glaring film and a protective layer or combinations thereof.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details. In other cases, in order to simplify the drawings the structure of the apparatus known only schematically depicted in figures.

Figure 1:
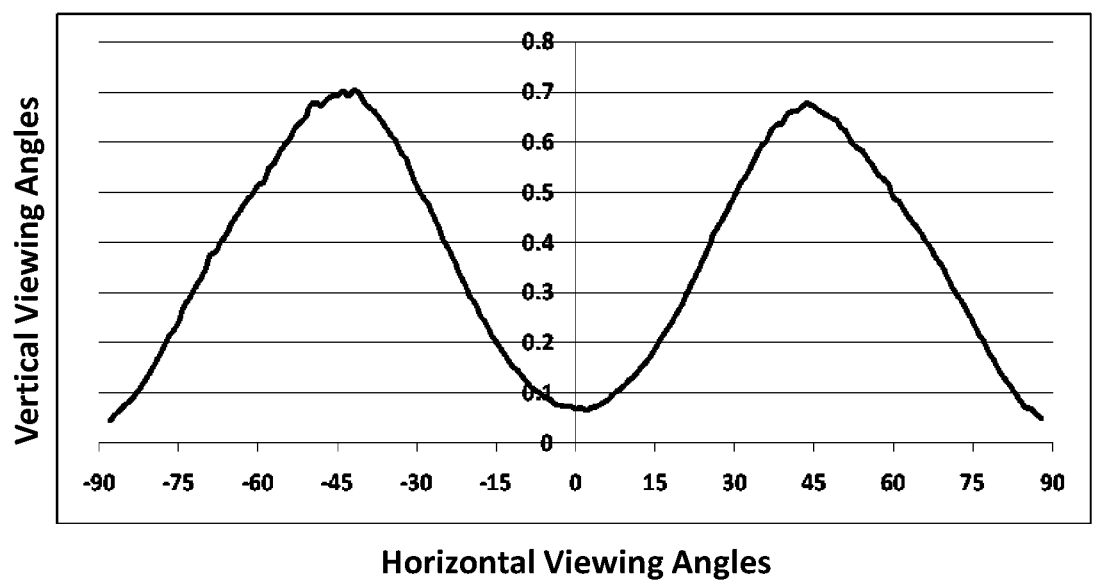
FIG. 1 is a brightness distribution in the dark-state of a common liquid crystal display at horizontal viewing angles.
Figure 2A:
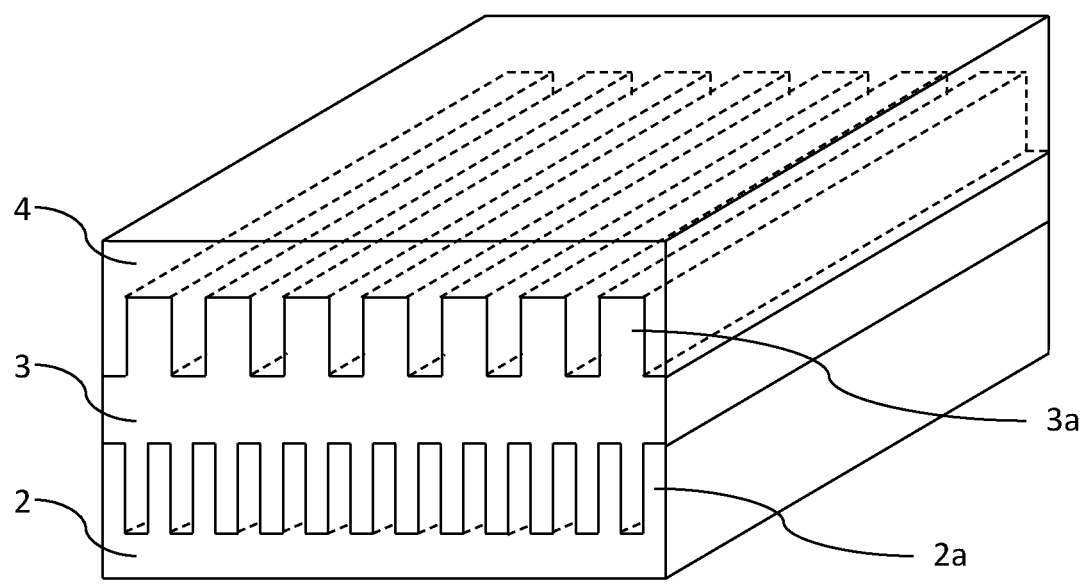
FIG. 2A is a stereoscopic perspective view of an optical film of an embodiment of the present invention.
Figure 2B:
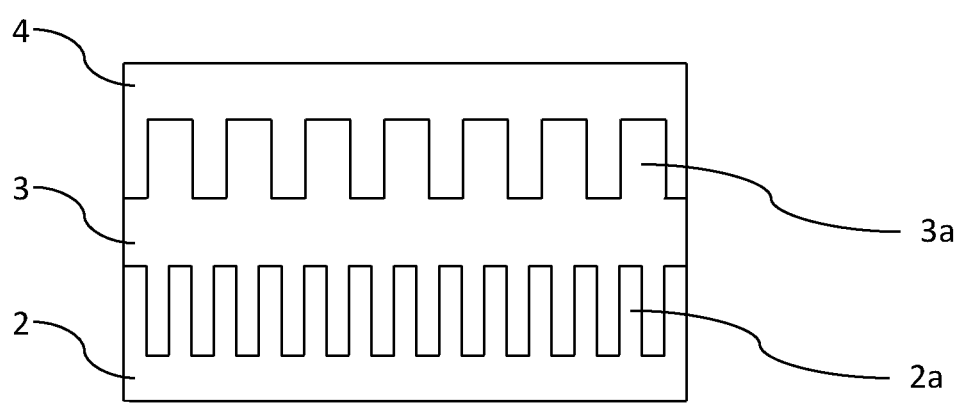
FIG. 2B is a cross sectional view of the embodiment of the optical film shown in FIG. 2A.

In a preferred embodiment of the present invention as shown in FIGS. 2A and 2B, the optical film 1 comprises a the first diffraction layer 2 with an upper surface and a lower surface (not shown), including a plurality of first diffraction gratings 2a arranged in the same direction on the upper surface thereof; a second diffraction layer 3 with a plurality of second diffraction gratings 3a arranged in the same direction gap-filled in and on the first diffraction gratings 2a of the first diffraction layer 2, wherein the directions of the first diffraction gratings 2a and the second diffraction gratings 3a are parallel to each other; and a cover layer 4 formed on the second diffraction gratings 3a of the second diffraction layer 3 to fill and planarize the second diffraction gratings 3a of the second diffraction layer 3.

In the optical films of the embodiments of the present invention, the first diffraction layer 2 has a first refraction index of n1, the second diffraction layer 3 has a second refraction index of n2, the cover layer 4 has a third refraction index of n3, and n1, n2 and n3 are all in the range of 1.4 to 1.7. The materials of the first diffraction layer 2, the second diffraction layer 3 and the cover layer 4 can be made from thermo curable or photo curable resins, such as acrylic resin, silicone resin, polyurethane resin, epoxy resin or the combination thereof.

In the optical films of the embodiments of the present invention, the second refraction index of n2 is greater than the first refraction index of n1 and the third refraction index of n3. The first refraction index of n1 and the third refraction index of n3 are the same or different. Thus, the refraction index between every two layers of the first diffraction layer 2, the second diffraction layer 3 and the cover layer 4 are different, wherein the differences of the refraction index between the second diffraction layer 3 and the first diffraction layer 2 and between the second diffraction layer 3 and the cover layer 4 are preferably between 0.1 and 0.3.

Figure 3:
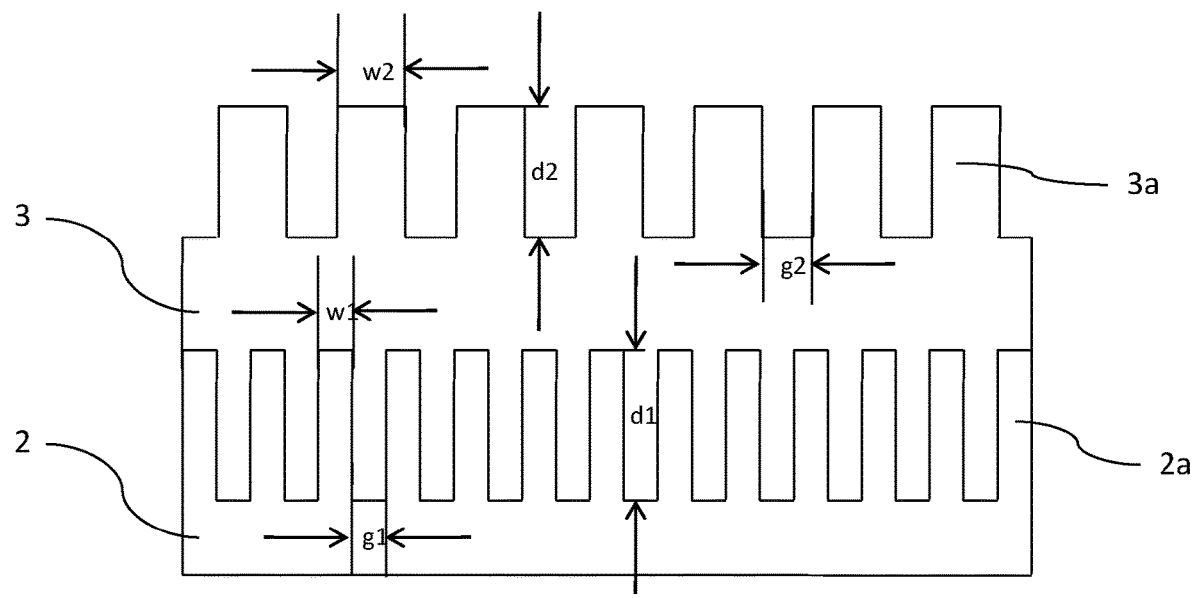
FIG. 3 is a cross-sectional view of the first diffraction layer and the second diffraction layer in accordance with a preferred embodiment of the present invention.

The microstructure dimensions of the first diffraction layer 2 and the second diffraction layer 3 can be varied in accordance with the pixel sizes of the desired display. Referring to FIG. 3, it shows a cross-sectional view of the first diffraction layer 2 and the second diffraction layer 3 in accordance with a preferred embodiment of the present invention. In an optical film of a preferred embodiment of the present invention, the width w1 of each of the first diffraction gratings 2a and the width w2 of each of the second diffraction gratings 3a are independently in the range of 0.3 μm to 1.5 μm. The depth d1 of each of the first diffraction gratings 2a and the depth d2 of each of the second diffraction gratings 3a are independently in the range of 0.5 μm to 1.5 μm. The grating gap g1 between adjacent two of the first diffraction gratings 2a and the grating gap g2 between adjacent two of the second diffraction gratings 3a are independently in the range of 0.3 μm to 1.5 μm.

In an optical films of a preferred embodiment of the present invention, the width w1, depth d1 and the gap g1 of the first diffraction gratings 2a and the width w2, depth d2 and the gap g2 of the second diffraction gratings 3a are the same or different.

Figure 4:
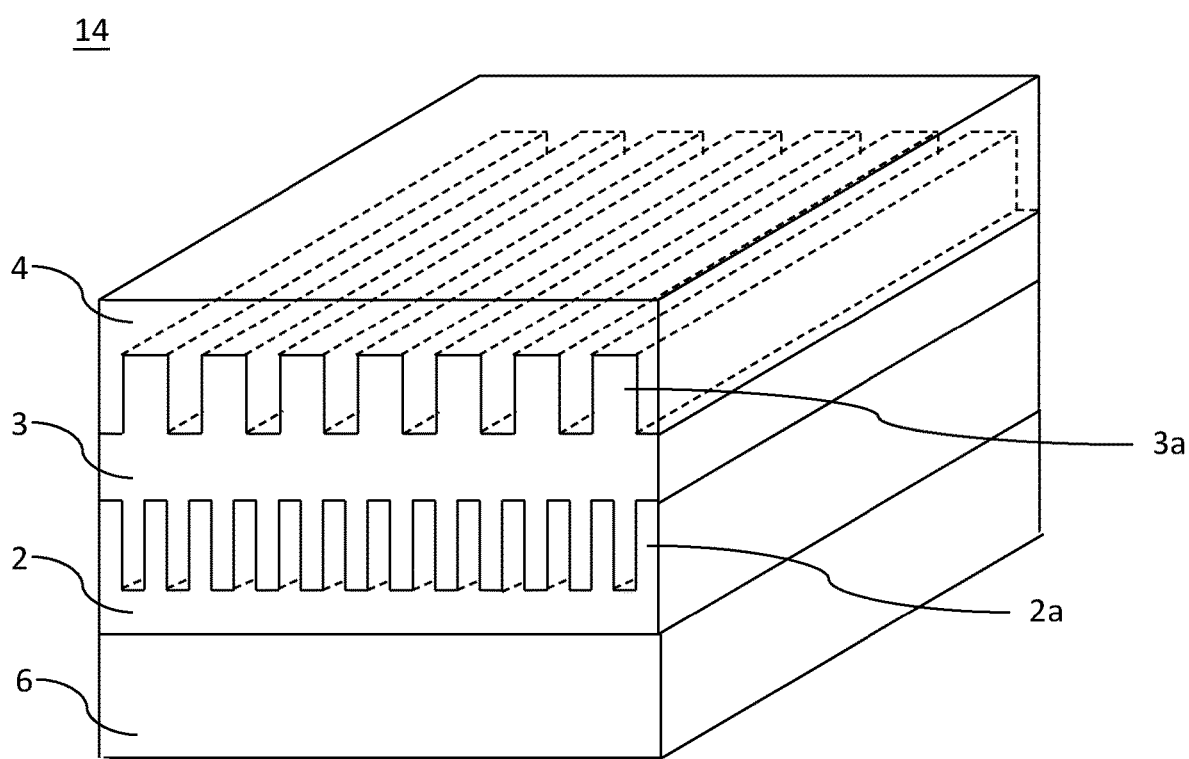
FIG. 4 is a stereoscopic perspective view of an optical film of a further preferred embodiment of the present invention.

In still another embodiment of the present invention as shown in FIG. 4, the optical film 14 further comprises a functional layer 5. The functional layer 5 is disposed on the lower surface of the first diffraction layer 2 of the optical film 14, wherein the functional layer 5 is selected from one of a group consisting of a polarizing layer, a hard-coating layer, a low reflective layer, an anti-reflective layer, an anti-glaring film and a protective layer or combinations thereof.

Various embodiments of the present invention are exemplified as following to illustrate the effects of the optical film of the present invention on improving the dark-state image quality at the wide viewing angle of the liquid crystal display. Table 1 shows the dimension setting 1 of the gratings of the diffraction layer of the present optical film and Table 2 shows the dimension setting 2 of the gratings of the diffraction layer of the present optical film. The gratings in the dimensions of the dimension setting 1 and 2 are individually full on the first diffraction layer or the second diffraction layer. The resin used as the second diffraction layer has a refraction index of 1.6. The resin used as the first diffraction layer and the cover layer have a refraction index of 1.5.

TABLE 1

Dimension setting 1 of gratings

| Dimension of gratings | Gratings | | | | | | | | | | |
|---|---|---|---|---|---|---|---|---|---|---|---|
| | 1 | 2 | 3 | 4 | 5 | 6 | 7 | 8 | 9 | 10 | 11 |
| Widths, w1 (μm) | 0.6 | 0.6 | 0.5 | 0.4 | 0.5 | 0.6 | 0.6 | 0.5 | 0.4 | 0.4 | 0.4 |
| Depths, d1 (μm) | 1.3 | 0.8 | 0.9 | 0.8 | 1.1 | 1.0 | 1.2 | 1.0 | 0.7 | 0.8 | 0.8 |
| grating gaps, g1 (μm) | 0.6 | 0.6 | 0.6 | 0.4 | 0.4 | 0.6 | 0.4 | 0.6 | 0.5 | 0.5 | 0.4 |

TABLE 2

Dimension setting 2 of gratings

| Dimension Set 2 of gratings | Gratings | | | | | | | | |
|---|---|---|---|---|---|---|---|---|---|
| | 1 | 2 | 3 | 4 | 5 | 6 | 7 | 8 | 9 |
| Widths, w2 (μm) | 0.7 | 0.7 | 0.7 | 0.81 | 0.81 | 0.81 | 1.28 | 1.28 | 1.28 |
| Depths, d2 (μm) | 0.9 | 0.9 | 0.9 | 0.9 | 0.9 | 0.9 | 1.0 | 1.0 | 1.0 |
| grating gaps, g2 (μm) | 0.7 | 0.7 | 0.7 | 0.81 | 0.81 | 0.81 | 1.28 | 1.28 | 1.28 |

Table 3 shows the optical properties of the optical films of the present invention on a liquid crystal display (BenQ GW2270, from BenQ Corp., Taiwan). The comparative example did not use any optical film of the present invention. Examples 1 to 2 show LC displays with the optical films of different embodiments of the present invention. The optical film used in Example 1 is an optical film of the present invention with the first diffraction gratings of the first diffraction layer of the dimensions as the dimension setting 1 and the second diffraction gratings of the second diffraction layer of the dimension as the dimension setting 2. The optical film used in Example 2 is an optical film of the present invention with the first diffraction gratings of the first diffraction layer of the dimension as the dimension setting 2 and the second diffraction gratings of the second diffraction layer of the dimension as the dimension setting 2.

TABLE 3

The optical properties of Comparative Example and Examples 1 to 2

| | Comparative Example | Example 1 | Example 2 |
|---|---|---|---|
| $LO_{max}$ (nits) | 0.703 | 0.628 | 0.391 |
| $LO_{max}$ angle(°) | 44 | 46 | 65 |
| $GDI_{avg}$ (60°~80°) | 1.55 | 1.33 | 1.26 |
| $P\text{-value}_{avg}$ (60°~80°) | 6.33 | 3.97 | 3.91 |
| P-value | 5.65 | 3.63 | 3.46 |

TABLE 3-continued

The optical properties of Comparative Example and Examples 1 to 2

|  | Comparative Example | Example 1 | Example 2 |
|---|---|---|---|
| (0.60) P-value (0.80) | 6.79 | 4.12 | 4.18 |

As shown in table 3, the values of maximum brightness in the dark-state of the liquid crystal display with zero-order ($L0_{max}$) of the Examples 1 to 2 are both smaller than the value of 0.703 nits of the comparative example, which represents that light leakage at wide viewing angle of the common liquid crystal display equipped with the present optical film can be reduced effectively and the common liquid crystal display equipped with the present optical film can present uniform dark-state images at various viewing angles. The maximum brightness in the dark-state of the liquid crystal display with zero-order occurs at viewing angle of 46° and 65° ($L0_{max}$ angle) respectively in the LC display of Examples 1 and 2, and occurs at viewing angle of 44° in the LC display of Comparative Example. It is obvious that the optical film of the present invention can significantly enlarge the viewing angles and reduce the dark-state light leakage at the wide viewing angles. GDI (Gamma Distortion Index) and P-value are indexes to evaluate the image quality at wide viewing angles, such as color saturation, contrast and color accuracy. GDI is calculated by measuring the distortion value of the gamma curve compared to the standard curve (such as gamma 2.2) of all order from L0 to L255. Therefore, lower value of GDI means the distortion is lower and represents the image quality at wide viewing angle is better. P-value is the difference between the actual measurement and the standard gamma curve at the order of L96, at this order the common liquid crystal display generally presents lower image quality. The lower P-value means the lower deviation. Therefore, the image quality can be evaluating by GDI and P-value. In table 3, the average GDI ($GDI_{avg}$) at 60°~80° horizontal viewing angle, average P-value ($P-value_{avg}$) at 60°~80° horizontal viewing angle, P-value(0, 60) at 60° horizontal viewing angle and P-value (0, 80) at 80° horizontal viewing angle measured on the displays of examples 1 to 2 are all smaller than those measured on the display of comparative example. The result shows that the optical films of the present invention enhance the image quality of the display effectively.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A liquid crystal display (LCD) comprising an optical film formed thereon, wherein the optical film comprises:
a first diffraction layer with a upper surface and a lower surface, including a plurality of first diffraction gratings arranged in the same direction on the upper surface thereof;
a second diffraction layer with a plurality of second diffraction gratings arranged in the same direction and gap-filled in and on the first diffraction gratings of the first diffraction layer, wherein the directions of the first diffraction gratings and the second diffraction gratings are parallel to each other; and
a cover layer formed on the second diffraction gratings of the second diffraction layer to fill and planarize the second diffraction gratings of the second diffraction layer;
wherein the first diffraction layer has a first refraction index of n1, the second diffraction layer has a second refraction index of n2, the cover layer has a third refraction index of n3, and the differences of the refractive index between n2 and n1 and between n2 and n3 are both in the range of 0.1 to 0.3.

2. The liquid crystal display (LCD) according to claim 1, wherein the first refraction index of n1, the second refraction index of n2 and the third refraction index of n3 of the optical film are all in the range of 1.4 to 1.7.

3. The liquid crystal display (LCD) according to claim 2, wherein the second refraction index of n2 is greater than the first refraction index of n1 and the third refraction index of n3.

4. The liquid crystal display (LCD) according to claim 2, wherein the first refraction index of n1 and the third refraction index n3 are the same or different.

5. The liquid crystal display (LCD) according to claim 1, wherein the widths, the depths and the grating gaps of the first diffraction gratings of the optical film and the widths, the depths and the grating gaps of the second diffraction gratings of the optical film are the same or different.

6. The liquid crystal display (LCD) according to claim 5, wherein the width of each of the first diffraction gratings of the optical film and the width of each of the second diffraction gratings of the optical film are independently in the range of 0.3 μm to 1.5 μm.

7. The liquid crystal display (LCD) according to claim 5, wherein the depth of each of the first diffraction gratings of the optical film and the depth of each of the second diffraction gratings of the optical film are independently in the range of 0.5 μm to 1.5 μm.

8. The liquid crystal display (LCD) according to claim 5, wherein the grating gap between adjacent two of the first diffraction gratings of the optical film and the grating gap between adjacent two of the second diffraction gratings of the optical film are independently in the range of 0.3 μm to 1.5 μm.

9. The liquid crystal display (LCD) according to claim 1, further comprising a functional layer on the lower surface of the first diffraction layer of the optical film, wherein the functional layer is selected from one of a group consisting of a polarizing layer, a hard-coating layer, a low reflective layer, an anti-reflective layer, an anti-glaring film and a protective layer or combinations thereof.

* * * * *